Jan. 7, 1941. F. M. STARR Re. 21,687

LINE DROP COMPENSATOR

Original Filed Nov. 24, 1937

Inventor:
Frank M. Starr,
by Harry E. Dunham
His Attorney.

Reissued Jan. 7, 1941

Re. 21,687

UNITED STATES PATENT OFFICE 21,687

LINE DROP COMPENSATOR

Frank M. Starr, Schenectady, N. Y., assignor to General Electric Company, a corporation of New York Original No. 2,185,715, dated January 2, 1940, Serial No. 176,293, November 24, 1937. Application for reissue November 6, 1940, Serial No. 364,603

16 Claims. (Cl. 171—119)

This invention relates to line drop compensators and it has for an object the production of an improved line drop compensator in which a true reactance setting may easily be secured. Another object of the invention is to produce a line drop compensator in which a true reactance setting and a true resistance setting are made by adjusting separate slide wire resistors.

A line drop compensator is a device which compensates a voltmeter for the voltage drop in a line between the point on the line to which the meter is connected and any other point on the line at which it is desired to know the voltage. In alternating current circuits, the voltage drop in a line always contains both a resistance component and a reactance component and consequently line drop compensators for such circuits are usually provided with an adjustable resistance element and an adjustable reactance element. The resistance element has usually been the equivalent of an ordinary rheostat in which adjustment is made by sliding an arm over a resistance wire. The reactance element, however, has usually been a reactor or reactance transformer provided with taps for securing adjustment. Because of its greater cost, and the necessarily limited number of taps, this way of securing adjustable reactance compensation has not been as good as the simple slide wire resistor adjustment of the resistance element.

In accordance with this invention, there is provided a novel and simple compensator in which true reactance compensation may easily and inexpensively be secured and in which this compensation may be adjusted in exactly the same manner as the resistance compensation, namely, by means of a slide wire resistor. By true reactance compensation is meant the production by the reactance element of a voltage in the voltmeter circuit which is a true reflection in magnitude and phase of the reactance voltage drop in the main line.

The invention will be better understood from the following description taken in connection with the accompanying drawing and its scope will be pointed out in the appended claims.

Figure 1:
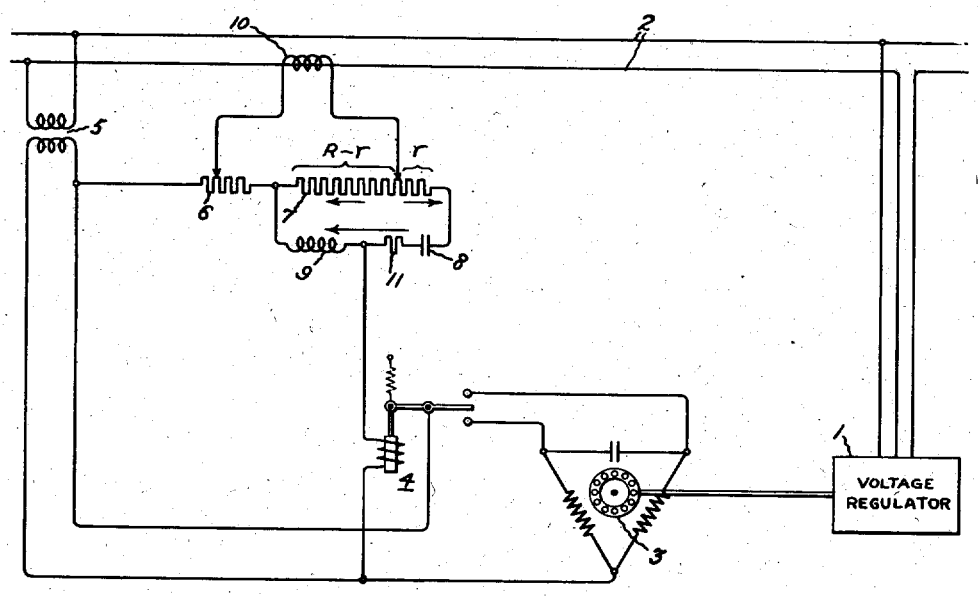
Figure 2:
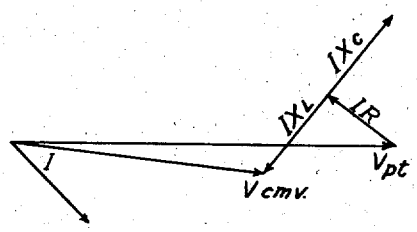

In the drawing, Fig. 1 is a diagrammatic showing of an embodiment of the invention and Fig. 2 is a vector diagram for illustrating its operation.

Referring now to the drawing and more particularly to Fig. 1, the invention is shown as applied to the control circuit for an automatic voltage regulator 1 for an alternating current power line 2. The regulator 1 may be of any well known type such, for example, as an induction regulator or a step regulator. This regulator is driven by a conventional reversible motor 3 whose direction of operation is controlled by the raise and lower contacts of a primary relay or contact making voltmeter 4. Both the motor and the contact making voltmeter are energized from the secondary winding of a potential transformer 5, whose primary winding is connected across the power line 2.

The line drop compensator consists of a resistance element in the form of slide wire resistor 6 and a reactance element in the form of a second slide wire resistor 7 combined with a capacitor 8 and a reactor 9 connected in series across the resistor 7. The compensator is energized in accordance with the current in the power line 2 by means of a current transformer 10.

The capacitor 8 and reactor 9 are so proportioned that their respective reactances are equal to each other at the rated frequency of the power line. As this amounts to a condition of series resonance, it may sometimes be desirable to limit the current in these elements by means of a relatively small auxiliary series resistor 11. The invention, however, in no wise depends on the presence of this auxiliary resistor.

The connections between the compensator and the primary relay are such that the resistance element 6 and the reactance element 9 are connected in series with the operating winding of the primary relay 4 across the secondary winding of the potential transformer 5.

The operation of the compensator is as follows. The current transformer current will divide through the two parts of the resistor 7, some of the current flowing through the left hand portion of 7 and the remainder of the current flowing through the right hand portion of 7 and then through the reactance elements 8 and 9 (and the auxiliary resistor 11) in series until it joins the current through the left hand part of the resistor 7 whereupon the two currents rejoin and return through the portion of the slide wire resistor 6 which is determined by the latter's setting. As the reactance elements 8 and 9 are numerically equal to each other and of opposite sign, they have practically no effect on the division of current and this current will therefore divide inversely as the resistances of the two parallel branches. If the total resistance of 7 is R, and the resistance of the portion thereof to the right of the adjustable slide wire is $r$, and that of the auxiliary current limiting resistor is $r_1$, the transformer current will divide inversely as $(R-r)$ and $(r+r_f)$. If the current transformer current is I, the current through the inductive reactance element will be $$I(R-r)\div(R+r_f)$$

If the inductive reactance has a value $X_1$, it therefore follows that the voltage drop through $X_1$ is equal to $I\cdot X_1\cdot(R-r)\div(R+r_f)$. Actually $r_f$ will be so small, if present at all, in comparison with the other resistance value that practically the reactance compensation will be $$IX_1\frac{(R-r)}{R}$$

As the current transformer current is actually only limited by resistance, the current through the reactor 9 will be practically in phase with the line current and consequently the voltage drop through the reactor 9 will be displaced 90° in phase from the line current.

As will be seen from the connections, the voltage drop across the reactor 9 is inserted directly in series with the operating coil of the primary relay 4.

Also in series with the operating coil of the primary relay 4 is the resistor 6 of the resistance element of the compensator and consequently, depending upon the setting of the slide wire on this resistor, an adjustable voltage which is in phase opposition to the current in the line 2, and consequently which is in phase with the resistance voltage drop in the line, is inserted in the primary relay or voltmeter circuit.

These vector relations can be seen more clearly from Fig. 2 in which the long horizontal vector labeled $V_{pt}$ is the voltage of the secondary winding of the potential transformer and the vector labeled I represents a lagging current in the line 2. Vector IR is the voltage drop inserted in the contact making voltmeter circuit by the resistance element 6 of the line drop compensator and by simply adjusting the position of the slide wire on this element, the vector IR may be made to bear exactly the same relation to the secondary voltage of the potential transformer $V_{pt}$ as exists between the actual resistance drop in the line 2 and the line voltage. The equal and opposite vectors $IX_1$ and $IX_c$, which are both at right angles to the vector IR, represent the individual voltage drops across the reactor 9 and the capacitor 8 respectively. By simply adjusting the position of the slide wire on the resistor 7, as has been previously explained, the magnitude of the voltage drop $IX_1$, which is inserted in the contact making voltmeter circuit, can be adjusted at will and can readily be made to bear the same relation to the potential transformer voltage $V_{pt}$ as exists between the actual reactance drop in the line 2 and the line voltage. The vector $V_{cmv}$ represents the voltage applied to the operating winding of the contact making voltmeter and is the vector sum of the potential transformer voltage and the resistance and reactance element voltages of the line drop compensator.

In the automatic voltage regulating system shown in Fig. 1, the operation is always such as to maintain constant voltage across the winding of the contact making voltmeter. This is because if the voltage applied to the voltmeter falls slightly below a normal value, its raise contacts will close and energize the motor 3 for such a direction of operation as to cause the voltage regulator to raise the voltage of line 2 until the raise contacts again separate. A corresponding operation takes place, in case the voltage of line 2 rises a small amount above normal, to cause the contact making voltmeter to close its lower contacts. That is to say the motor will be reversed and the regulator will lower the voltage until the lower contacts again separate.

It will thus be seen that the vector $V_{cmv}$ stays constant in magnitude and that changes in the magnitude or phase angle or both of the current vector I will change the values of the resistance and reactance drops IR and $IX_1$ with the result that the voltage of the potential transformer secondary will be changed, by means of the regulator, until a new value of $V_{pt}$ is reached at which the vector sum of the constant contact making voltmeter voltage and the variable resistance and reactance drops will equal the potential transformer voltage.

It should be noted that the capacitor 8 is an important feature of the invention and makes it possible easily to secure true reactance compensation. Thus, if the capacitor was omitted, the voltage drop across the reactor 9 would only be in quadrature with the current transformer current when the impedance of the reactor was infinitely less than the resistance R of resistor 7. For practical ratios of these values an appreciable error would be introduced in the reactance compensation. The series resonance produced by capacitor 8 reduces the impedance of the branch containing the reactor to a value which is almost infinitely less than a practical value of resistance R of resistor 7 and thus produces practically true and errorless reactance compensation.

In the above description the simplifying assumption has tacitly been made that the reactor 9 is a pure reactor containing no inherent resistance. While this is only possible in theory it is possible by special construction, resulting in a relatively large and expensive reactor, to produce a reactance device having a negligible amount of resistance in comparison with its reactance. Most commercial reactors and those which are made up to have a relatively large reactance for their size inherently have an appreciable amount of resistance. When such a reactor is used true reactance compensation will be obtained with my invention because the series capacitor 8 will be so proportioned with respect to the constants of the reactor that the voltage drop across the reactor will be in phase with the reactance voltage drop in the main circuit 2.

While there is shown and described a particular embodiment of this invention it will be obvious to those skilled in the art that changes and modifications can be made without departing from this invention, and it is therefore aimed in the appended claims to cover all such changes and modifications as fall within the true spirit and scope of the invention.

What I claim as new and desire to secure by Letters Patent of the United States, is:

1. In a line drop compensated voltage sensitive system, an alternating current line, a voltage measuring device connected to respond to the voltage at a point on said line, a fixed reactor connected in circuit with said voltage measuring device, means for causing an alternating current which is proportional to the current in said line to flow through said reactor, means for adjusting the ratio of the line current to the reactor current, and means for causing the reactor current to be substantially in phase with the line current at any adjusted ratio of said currents.

2. In a line drop compensated voltage sensitive system, an alternating current line, a voltage measuring device connected to respond to the voltage at a point on said line, a fixed reactor connected in circuit with said voltage measuring device, means for causing an alternating current which is proportional to the current in said line to flow through said reactor, a slide wire resistor for adjusting the ratio of the line current to the reactor current, and a capacitor for causing the reactor current to be substantially in phase with the line current at any adjusted ratio of said currents.

3. In a line drop compensator, an adjustable reactance element comprising two electrically parallel branches, one of said branches containing serially connected numerically equal inductive and capacitive reactance devices, variable resistors in each of said branches, and means for simultaneously and oppositely adjusting the values of said resistors.

4. In a line drop compensator, an adjustable reactance element comprising series resonant reactance devices, means for circulating therein a current proportional to the current in an alternating current line, and a slide wire resistor for adjusting the ratio of the current in said devices to the current in said line.

5. In a compensated voltage sensitive system, a line drop compensator comprising a pair of serially connected rheostats, a reactor and a capacitor connected in series with each other and in shunt with one of said rheostats, and a voltage sensitive circuit connected to contain the other of said resistors and said reactor serially connected therein.

6. In a line drop compensated voltage sensitive system, an alternating current power line, a voltage measuring device connected to respond to the voltage at a point on said line, a fixed reactor connected in circuit with said device, a resistor and a capacitor in series with reactor, said reactor and capacitor having equal ohmic values at the normal frequency of said power line, a slide wire adjuster on said resistor, and means for circulating a current proportional to the current in said line between said slide wire adjuster and a point of the circuit on said measuring device outside said resistor.

7. In combination, an alternating current power line having a normal frequency, an automatic voltage regulator therefor, a primary relay for controlling said regulator, said relay being connected to respond to the voltage of said line, and a line drop compensator for said relay and regulator comprising a resistor and a reactor connected in series in circuit with said primary relay, a second resistor and a capacitor connected in series with each other and in parallel with said reactor, said reactor and capacitor having equal ohmic values at the normal frequency of said line, separate slide wire adjusters on each of said resistors, and a current transformer having its primary winding in said line and the terminals of its secondary winding connected respectively to said slide wire adjusters.

8. In a line drop compensator for adapting an automatic voltage regulator to maintain constant voltage at a distant point on an alternating current power circuit, a reactive device, means for circulating through said device a current derived from the power current in said circuit, and means for causing the phase relation of said currents to be such that the voltage drop across said device is in phase with the reactance voltage drop in said power circuit.

9. In a line drop compensator for adapting an automatic voltage regulator to maintain constant voltage at a distant point on an alternating current power circuit, a reactive device, means for circulating through said device a current derived from the power current in said circuit, means for adjusting the ratio of said circuit current to said reactance device current, and means for causing the phase relation of said currents to be such that the voltage drop across said device is in phase with the reactance voltage drop in said power circuit.

10. In a line drop compensator for adapting an automatic voltage regulator to maintain constant voltage at a distant point on an alternating current power circuit, a reactive device, means for circulating through said device a current derived from the power current in said circuit, and reactive means of opposite sign from said reactive device for causing the voltage drop across said device to be in phase with the reactance voltage drop in said power circuit.

11. In a line drop compensator for adapting an automatic voltage regulator to maintain constant voltage at a distant point on an alternating current power circuit, an inductive reactance device, means for circulating through said device a current derived from the power current in said circuit, means for adjusting the ratio of said circuit current to said reactance device current, and a capacitor for causing the voltage drop across said reactance device to be in phase with the reactance voltage drop in said power circuit.

12. In a line drop compensator for adapting an automatic voltage regulator to maintain constant voltage at a distant point on an alternating current power circuit, a reactive device, means for circulating through said device a current derived from the power current in said circuit, and opposite sign reactive means connected in series with said reactive device with respect to said circulating current for causing the phase relation of said currents to be such that the voltage drop across said device is in phase with the reactance voltage drop in said power circuit.

13. In a line drop compensator for adapting an automatic voltage regulator to maintain constant voltage at a distant point on an alternating current power circuit, an inductive reactance device, means for circulating through said device a current derived from the power current in said circuit, means comprising a slide wire adjustable type impedance element connected in parallel with said reactance device for adjusting the ratio of said circuit current to said reactance device current, and a capacitor connected in series with said reactance device with respect to said circulating current for causing the phase relation of said currents to be such that the voltage drop across said device is in phase with the reactance voltage drop in said power circuit.

14. In a line drop compensated voltage sensitive system, an alternating current line, a voltage measuring device connected to respond to the voltage at a point on said line, a reactive device, means for circulating through said reactive device a current derived from the power current in said line, adjustable impedance means in parallel circuit relation with said reactive device for varying the ratio of said currents, and means for causing the phase relation of said currents to be such that the voltage drop across said reactive device is in phase with the reactance voltage drop in said power line.

15. In a line drop compensated voltage sensitive system, an alternating current line, a voltage measuring device connected to respond to the voltage at a point on said line, a reactive device, means for circulating through said reactive device a current derived from the power current in said line, means including a rheostat connected in parallel circuit relation with said reactive device for adjusting the ratio of said line current to said reactive device current, and means for causing the phase relation of said currents to be such that the voltage drop across said reactive device is in phase with the reactance voltage drop in said power circuit at any adjusted ratio of said currents.

16. In combination, an alternating current power line, an automatic voltage regulator therefor, a primary relay for controlling said regulator, said relay being connected to respond to the voltage of said line, and a line drop compensator for said relay and said regulator comprising a resistor and a reactor connected in series in circuit with said primary relay, a second resistor and a capacitor connected in series with each other and in parallel with said reactor, and a current transformer having its primary winding connected in said line and the terminals of its secondary winding adjustably connectible to points on said resistors.

FRANK M. STARR.